United States Patent [19]

Swanson

[11] 4,452,315
[45] Jun. 5, 1984

[54] STRAW AND DEBRIS DEFLECTOR FOR SOIL OPENING APPARATUS

[76] Inventor: Guy J. Swanson, S. 4305 University, Spokane, Wash. 99206

[21] Appl. No.: 420,060

[22] Filed: Sep. 20, 1982

[51] Int. Cl.³ .......................... A01C 5/06; A01B 49/06
[52] U.S. Cl. ...................................... 172/29; 172/142; 172/156; 172/515; 172/575
[58] Field of Search ............... 172/142, 575, 574, 711, 172/606, 155, 156, 159, 160, 514, 515, 517, 126, 707

[56] References Cited

U.S. PATENT DOCUMENTS

| | | | |
|---|---|---|---|
| 1,602,651 | 10/1926 | Counts | 172/517 |
| 1,680,031 | 8/1928 | White | 172/142 |
| 2,342,911 | 2/1944 | White | 172/29 |
| 3,322,203 | 5/1967 | Johnson | 172/142 |
| 3,826,315 | 7/1974 | Blair | 172/514 |
| 4,207,823 | 6/1980 | Steilen | 172/575 |

Primary Examiner—Richard J. Johnson
Attorney, Agent, or Firm—Wells, St. John & Roberts

[57] ABSTRACT

Disclosed is an apparatus for deflecting straw and other debris from in front of a soil opening implement used in farming. The straw and debris deflector is particularly useful where the soil is generally not tilled. The straw and debris deflector includes an adjustable bracket which extends forward of the soil opening disk of the implement. Extending downwardly from the end of the bracket is a flexible oscillating tine. The tine rubs along the surface of the ground immediately in front of the soil openers to collect and deflect straw and other debris. The flexible tine oscillates forwardly and backwardly and from side to side. Periodic flexing to one or the other side of the disk removes collected debris from in front of the tine.

7 Claims, 6 Drawing Figures

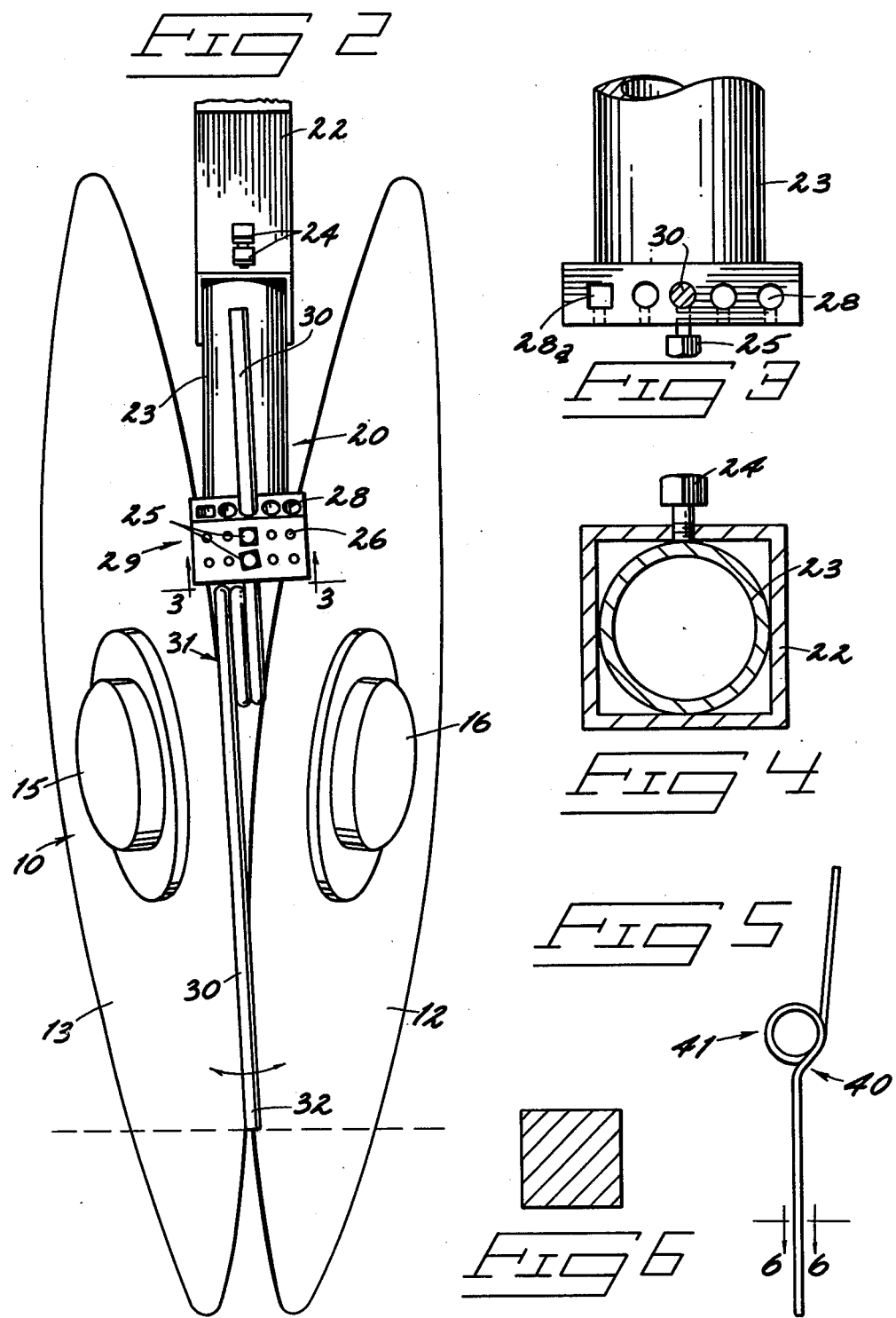

STRAW AND DEBRIS DEFLECTOR FOR SOIL OPENING APPARATUS

TECHNICAL FIELD OF THE INVENTION

The technical field of this invention is apparatus for removing or deflecting straw and other debris from in front of a soil opening apparatus used in farming where the soil is not generally tilled.

BACKGROUND OF THE INVENTION

In recent years there has been increased development in equipment and techniques for farming without generally tilling the entire surface of a field. These no-till farming techniques generally rely upon a disk type soil opener to break the surface of the soil in a localized area so that seed, fertilizer, and other agricultural chemicals can be placed directly in the soil without over generally plowing or breaking up the upper topsoil as is commonly done. When disk type soil openers are used, it is necessary for the disk to penetrate into the soil to open a furrow into which the seed or other materials are placed. Because the field has generally not been cultivated, there is usually straw or other types of stubble and debris remaining from the previous year's crop. This straw and other debris substantially impedes the efficient opening of the soil by disk soil openers. The disk opener oftentimes rides up on large clumps of straw, thereby preventing the soil from being opened. When farmers encounter difficulty in opening the soil, they must slow the speed of the equipment or add additional weight. This takes longer for the work to be completed and requires greater fuel because of the additional weight which is pulled.

No-till farming has also suffered from difficulties caused by straw being tucked into the furrow by the soil opener. Other rotting debris and residue are also found on the soil and the soil opener also tends to turn this into the soil as the furrow is opened. The straw residue and rotting debris add to the problems associated with various plant diseases including the disease pythium. Debris in the furrow also inhibits good seed germination and seeding emergence.

The prior art includes an apparatus called a "duff scuffer" which slid along the ground in front of the soil openers. Duff scuffers suffered from several limitations. The duff scuffers could only be used with rows having a spacing for which they were designed, such as the common fifteen inch spacing. The duff scuffers also did not remove the straw and debris as effectively as the current invention.

This invention is not to be confused with harrow attachments which are mounted on seed drills. U.S. Pat. No. 3,631,929 to Robert B. Gates shows a harrow tooth attachment which extends downwardly from the seed drill frame and penetrates into the soil a few feet ahead of the disk soil opener so that the soil is cultivated shortly before seeding takes place.

The invention is directed to solving the problems discussed above and other objectives and benefits of the invention will be considered below or are inherent in the structure and function of the invention.

BRIEF DESCRIPTION OF THE DRAWINGS

A preferred embodiment of the present invention is illustrated in the accompanying drawings in which:

FIG. 2 is a front elevational view of the apparatus shown in FIG. 1;

FIG. 3 is a top view of the apparatus used to mount the tine;

FIG. 4 is a cross-sectional view taken along line 4—4 of FIG. 1;

FIG. 5 is an alternative embodiment of the straw and debirs deflector; and

FIG. 6 is a cross-sectional view taken along line 6—6 of FIG. 5.

DESCRIPTION OF THE PREFERRED EMBODIMENTS

Figure 1:
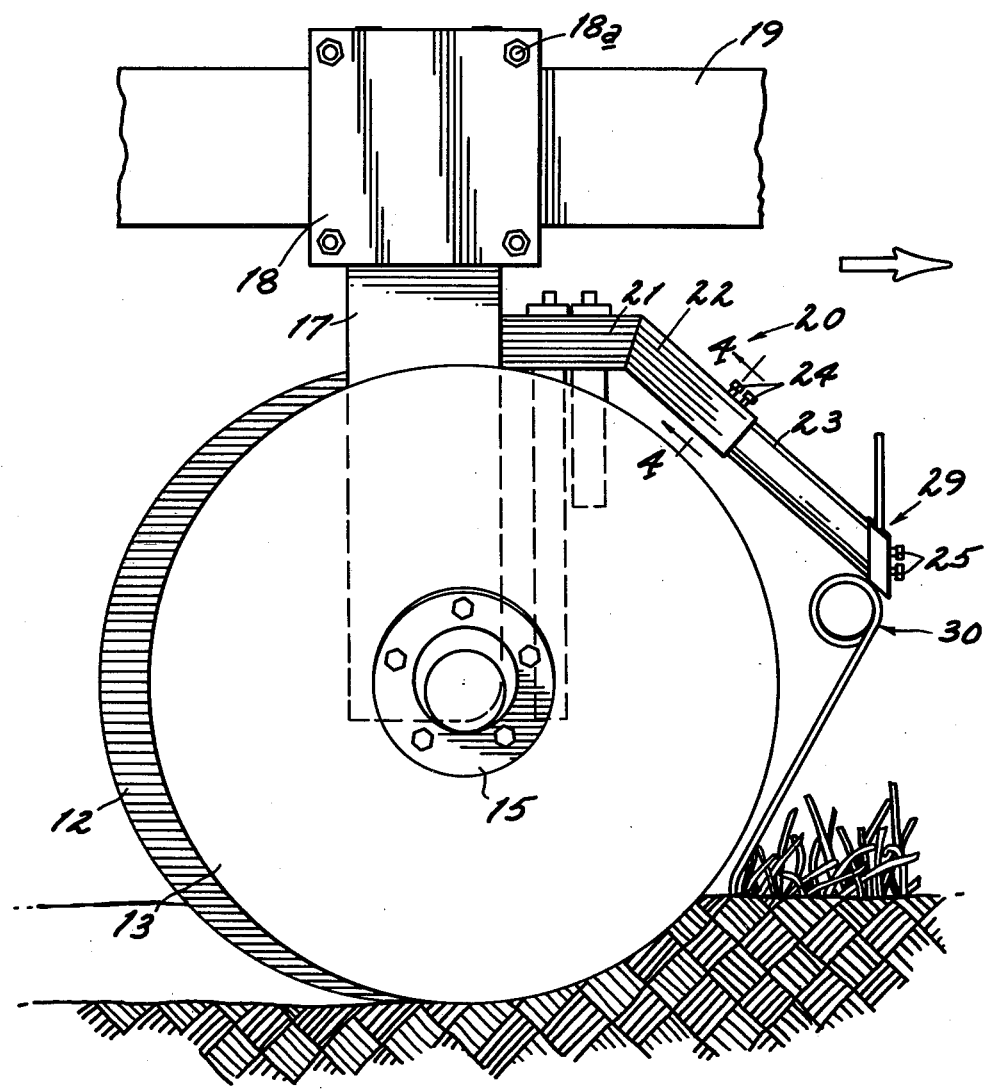
FIG. 1 is a side elevational view of the invention installed on a soil opening apparatus shown progressing through a straw laden field.

The following disclosure is submitted in compliance with the constitutional purpose of the Patent Laws "to promote the progress of science and useful arts" (Article 1, Section 8).

A soil opening apparatus generally referred to by the reference number 10 is shown in FIG. 1. Such a soil opening apparatus is commonly used in a seed drill or other no-till farming equipment. The soil openers include disks 12 and 13 which are rotatably connected to vertical member 17 by rotatable hubs 15 and 16. Disk 13 is mounted forward of disk 12 to improve the soil cutting ability of the soil openers. Vertical member 17 is securely fastened to tool bar 19 using a plate 18 and mounting bolts 18a.

Attached to vertical member 17 is a bracket generally referred to by the reference number 20. Bracket 20 has a first portion 21 which is welded to a second portion 22. Second portion 22 telescopically receives a third portion 23 which is securely held in second portion 22 by bolts or other fastening means 24. The telescopic arrangement of second portion 22 and third portion 23 allows the angular orientation and length of the bracket to be adjusted by rotating or extending third portion 23. At the distal end of the third portion 23 is a mounting means 29. Mounting means 29 is a metal plate having slots 28 for receiving one or more flexible tines 30 therein. The tine or tines 30 are held in position by bolts 25 which are threadably received in holes 26. This arrangement allows the flexible tines to be positioned vertically and horizontally.

The flexible tine 30 is provided with loops 31 which increase the flexibility of the tine. A variety of shapes and configurations can be incorporated into the form of the tine to provide this greater flexibility. The preferred form of the invention includes two substantially circular loops which allow the distal end 32 to oscillate frontward and backward and also from side to side. Tine 30 is alos preferably angled backwardly so that it contacts the surface of the soil at a point very near the disks 12 and 13.

FIG. 5 shows an alternative embodiment of tine 40 having a single substantially circular loop 41 formed centrally in the tine. FIG. 6 shows that tine 40 is square-shaped in cross section for fitting into a square slot 28a.

The invention is used by first attaching a bracket 10 to the soil opening apparatus 10 in a position which allows the flexible tine 30 to be positioned near the front of the disks 12 and 13. The tine 30 is then installed in one of slots 28 and the vertical and horizontal position of the distal end 32 of tine 30 is adjusted using bolts 25 and also by adjusting the angular and extension position of third portion 23 within second portion 22 of the bracket.

After proper adjustment is made at these two adjustment points, the straw and debris deflector is ready to be used with the soil opener.

The straw and debris deflector operates by sliding the distal end 32 along the ground to catch or deflect stubble, straw, and other debris so that it does not lie on the ground as the disks 12 and 13 open the soil. Because of irregularities in the depth of the disk and in the surface contour of the soil, tine 30 must oscillate forwardly, backwardly and from side to side in order to maintain substantially continuous contact with the soil surface. When large amounts of straw or other debris have accumulated in front of the distal end 32 of tine 30, the tine tends to flex backwardly and to one side of the disks 12 and 13. As the tine 30 slides along the side of either disk, the straw and other debris is removed from in front of the tine 30. The tine then springs back forwardly to resume its sliding action along the ground deflecting straw and other debris from in front of the disks 12 and 13.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. A straw and debris deflector used with a soil opening apparatus for untilled farmland to aid in the efficient opening of the soil by catching or deflecting straw and other debris from the path of a soil opener forming a part of said soil opening apparatus, comprising;
    a bracket for mounting upon the soil opening apparatus at a point adjacent the soil opener, the bracket comprising:
        (a) a first portion for rigid connection to the soil opening apparatus;
        (b) a second portion rigidly connected to said first portion and extending forwardly and downwardly therefrom;
        (c) a third portion telescopically and adjustably interconnected with said second portion, to allow extension of the third portion with respect to the second portion; the third portion also having a distal end opposite from interconnection with the second portion;
        (d) fastening means for adjustably securing the relative position of the third portion with respect to the second portion; and
        (e) an adjustable mounting means connected to the distal end of the third portion; and
    a flexible tine adjustably mounted in said mounting means, the tine extending downwardly therefrom to define a distal end which is near ground level and close to the point where the soil opener breaks the ground open.

2. The straw and debris deflector of claim 1 wherein the mounting means has a plurality of slots for receiving tines therein and means for holding tines in the slots.

3. The straw and debris deflector of claim 1 wherein the second portion telescopically receives the third portion and the third portion is cylindrically shaped to allow rotation and extension thereof.

4. The straw and debris deflector of claim 1 wherein the tine has at least one centrally located loop formed therein for providing flexibility.

5. The straw and debris deflector of claim 1 wherein the tine is shaped with at least two bends therein for flexibility and to place the distal end of the tine near the soil opener.

6. The straw and debris deflector of claim 2 wherein the tine has substantially circular loops formed in the tine between the bracket and the distal end of the tine.

7. A straw and debris deflector for use in farming with soil opening apparatus having double disk soil openers, comprising;
    a bracket for mounting upon the soil opening apparatus at a point adjacent the soil opener, the bracket comprising:
        (a) a first portion for rigid connection to the soil opening apparatus;
        (b) a second portion rigidly connected to said first portion and extending forwardly and downwardly therefrom;
        (c) a third portion telescopically and adjustably interconnected with said second portion, to allow extension of the third portion with respect to the second portion; the third portion also having a distal end opposite from interconnection with the second portion;
        (d) fastening means for adjustably securing the relative position of the third portion with respect to the second portion, and
        (e) an adjustable mounting means connected to the distal end of the third portion; and
        (f) a flexible tine adjustably mounted in the mounting means, the tine extending downwardly therefrom to define a distal end which is near ground level and close to the point where the soil opener breaks the ground open;
    whereby the tine deflects or catches straw and other debris so that the double disk soil openers can cut into the soil without cutting through the straw and debris.

* * * * *